United States Patent [19]

Kobsa et al.

[11] Patent Number: 5,200,140
[45] Date of Patent: Apr. 6, 1993

[54] CABLE CONTROL ROD DRIVE ASSEMBLY

[75] Inventors: Irvin R. Kobsa, San Jose; Charles W. Dillmann, Morgan Hill, both of Calif.

[73] Assignee: General Electric Company, San Jose, Calif.

[21] Appl. No.: 834,744

[22] Filed: Feb. 12, 1992

[51] Int. Cl.$^5$ .............................................. G21C 7/12
[52] U.S. Cl. ...................................... 376/227; 376/233
[58] Field of Search ........................ 376/227, 230, 233

[56] References Cited

U.S. PATENT DOCUMENTS

| | | | |
|---|---|---|---|
| 3,197,378 | 7/1965 | Fortescue | 376/230 |
| 3,347,748 | 10/1967 | Olsson | 176/36 |
| 3,406,093 | 10/1968 | Paratesi et al. | 176/36 |
| 3,785,923 | 1/1974 | Bratoljic et al. | 176/36 R |
| 3,843,471 | 10/1974 | Bevilacqua et al. | 176/36 R |
| 3,957,577 | 5/1976 | Treshow | 176/36 R |
| 4,030,972 | 6/1977 | Groves | 176/36 R |
| 4,044,622 | 8/1977 | Matthews | 74/424.8 R |
| 4,219,384 | 8/1980 | Cramer et al. | 376/230 |
| 4,238,288 | 12/1980 | Anikin et al. | 176/36 R |
| 4,293,381 | 10/1981 | Goetzmann et al. | 376/230 |
| 4,518,559 | 5/1985 | Fischer et al. | 376/230 |
| 4,624,825 | 11/1986 | Martin et al. | 376/227 |

*Primary Examiner*—Donald P. Walsh
*Assistant Examiner*—Frederick H. Voss
*Attorney, Agent, or Firm*—Robert R. Schroeder

[57] ABSTRACT

A control rod is selectively positioned in a nuclear reactor core inside a reactor pressure vessel by a drive assembly. The assembly includes a flexible cable releasably joined to the control rod by a coupling. A drive is joined to the cable for selectively advancing and retracting in opposite directions the cable for selectively positioning the control rod in the reactor core. In exemplary embodiments, the drive and cable may be disposed above or below the reactor core. In another embodiment, a pressurized driving fluid may be used to additionally position the control rod within the reactor core.

14 Claims, 4 Drawing Sheets

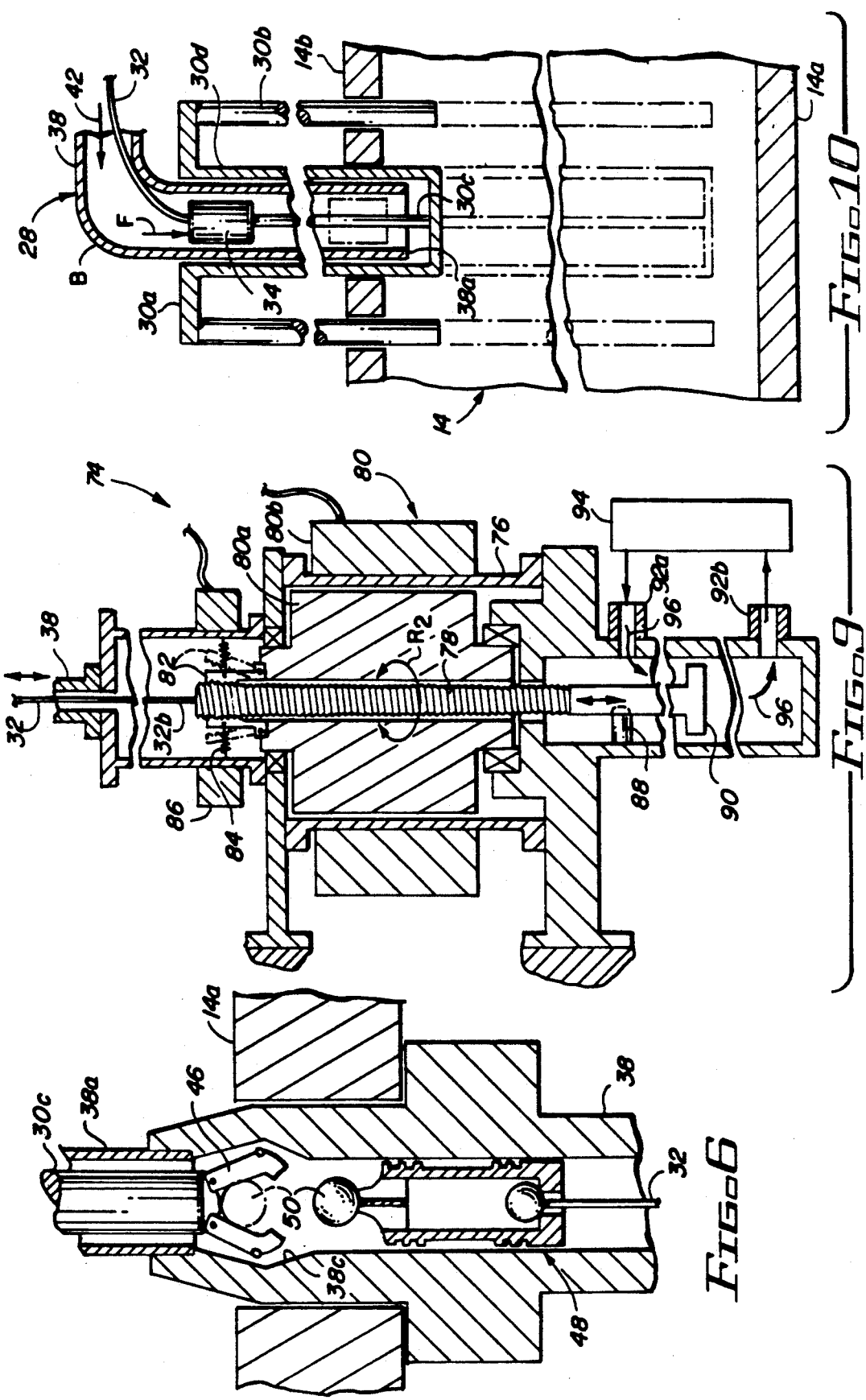

CABLE CONTROL ROD DRIVE ASSEMBLY

TECHNICAL FIELD

The present invention relates generally to nuclear reactors, and, more specifically, to an assembly for driving control rods into and out of a reactor core thereof.

BACKGROUND ART

A conventional nuclear reactor includes a pressure vessel containing a nuclear reactor core. The vessel contains reactor water which is heated and boiled by the reactor core in an exemplary boiling water reactor (BWR) for generating reactor steam having a pressure of about 70 kg/cm$^2$ for example.

In order to control the reactivity within the core, a plurality of conventional control rods containing a nuclear poison are selectively inserted into or withdrawn from the reactor core by conventional control rod drives. A typical control rod is relatively long and straight in the vertical direction and is joined to an actuator rod extending from the control rod drive. The control rod drive is typically mounted below the pressure vessel with the actuator rod extending upwardly through the lower head thereof. The length of the actuator rod is about equal to the length of the control rod so that the control rod may be fully inserted upwardly into the reactor core and fully withdrawn therefrom. The length of the control rod drive is also about equal to the length of the actuator rod so that the rod may be extended therefrom for inserting the control rod into the reactor core, and withdrawn therein so that the control rod may be withdrawn from the reactor core.

Accordingly, this vertical arrangement of control rod drive, actuator rod, and control rod has a combined length of about three times the stroke or length of the control rod itself. In order to allow for removal of the control rod drives from below the reactor pressure vessel, another, or fourth stroke length, is typically provided below the control rod drives in an open space to provide access to the control rod drives. The resulting combined vertical length of the control rod, actuator rod, and control rod drive, as well as the additional stroke length for access therebelow, results in a relatively long assembly which in turn requires a relatively tall reactor pressure vessel as well as containment building in which the pressure vessel is disposed. An attendant increase in complexity and cost thereof results.

However, the vertical arrangement of the control rods and the bottom-mounted control rod drives typically requires that the control rods be pressure driven upwardly against the force of gravity for Scram insertion into the core.

OBJECTS OF THE INVENTION

Accordingly, one object of the present invention is to provide a new and improved control rod drive assembly.

Another object of the present invention is to provide an improved control rod drive assembly which allows a reduction in vertical height of the assembly itself, and in turn, of the pressure vessel.

Another object of the present invention is to provide a compact control rod drive assembly which allows for gravity driven insertion of control rods.

DISCLOSURE OF INVENTION

A control rod is selectively positioned in a nuclear reactor core inside a reactor pressure vessel by a drive assembly. The assembly includes a flexible cable releasably joined to the control rod by a coupling. A drive is joined to the cable for selectively advancing and retracting in opposite directions the cable for selectively positioning the control rod in the reactor core. In exemplary embodiments, the drive and cable may be disposed above or below the reactor core. In another embodiment, a pressurized driving fluid may be used to additionally position the control rod within the reactor core.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

FIG. 6 is an enlarged view of the coupling illustrated in FIG. 4 showing disengagement of the cable from the control rod.

FIG. 9 is a schematic representation of a third embodiment of a drive used for advancing and retracting the cable illustrated in FIG. 1.

FIG. 10 is a schematic representation of an alternate embodiment of the drive assembly illustrated in FIG. 1 showing the cable extending upwardly from the top of the reactor core.

MODE(S) FOR CARRYING OUT THE INVENTION

Figure 1:
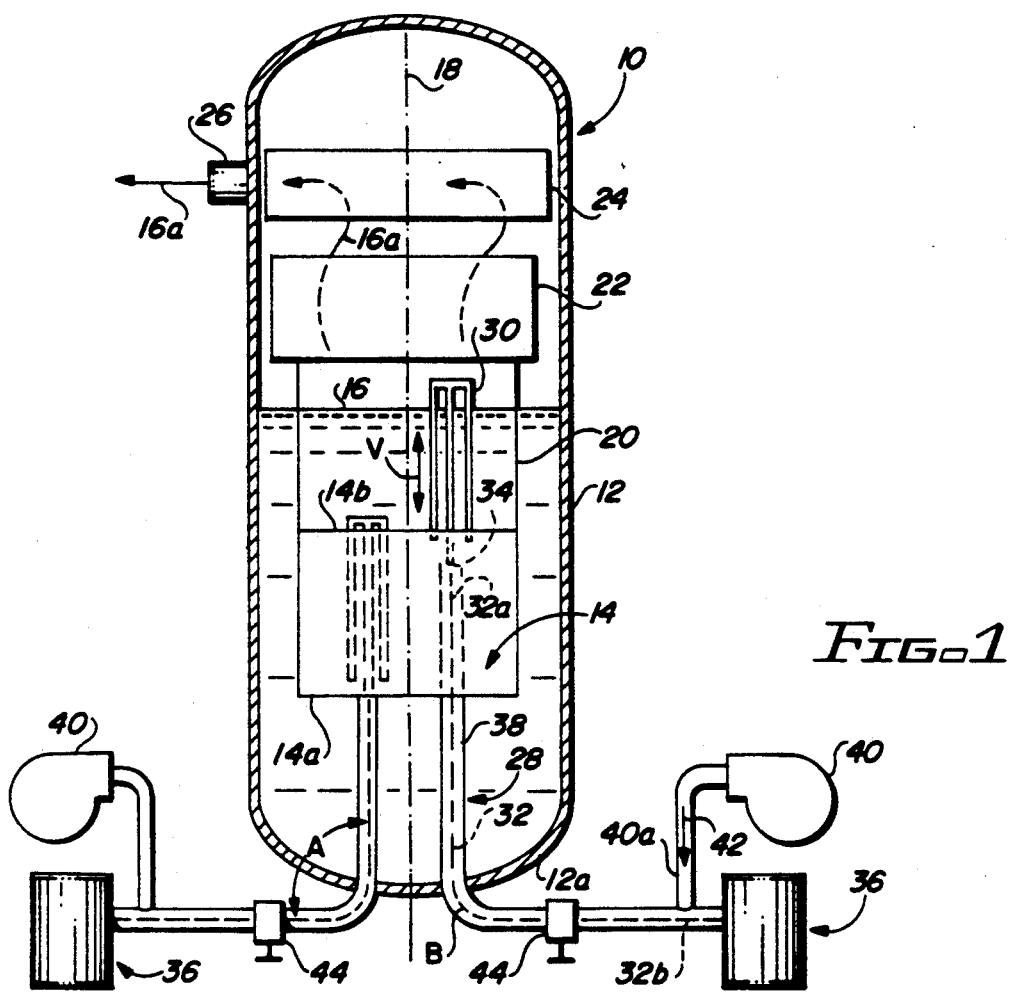
FIG. 1 is a schematic, elevation view of a nuclear reactor including a cable control rod drive assembly in accordance with one embodiment of the present invention.

Illustrated schematically in FIG. 1 is an exemplary nuclear reactor 10 including a conventional reactor pressure vessel 12 including therein a nuclear reactor core 14 containing conventional reactor fuel rods in the form of conventional fuel bundles. The pressure vessel 12 includes reactor water 16 which is conventionally heated and boiled by the core 14 for generating reactor steam 16a. The reactor 10 is disposed vertically in a containment building and has a longitudinal or vertical axis 18. Disposed vertically in turn above the core 14 is a chimney 20, conventional steam separators 22, and a conventional steam dryer 24. The steam 16a is discharged from the pressure vessel 12 through a conventional main outlet nozzle 26 and conventionally channeled to a steam turbine for example.

In order to control the reactivity inside the core 14, an assembly 28 in accordance with one embodiment of the present invention is provided for selectively positioning a control rod 30 parallel to, or along, the vertical axis 18 in the reactor core 14. The core 14 includes a plurality of the control rods 30 as conventionally required for controlling the reactivity therein, with one or more of the control rods 30 being positioned by one of the control rod drive assemblies 28. Two control rods 30 and respective drive assemblies 28 are illustrated in FIG. 1 as representative of the substantial number thereof which would be actually used in the reactor 10.

The core 14 includes a bottom 14a in any suitable form such as a plate or grid having conventional apertures therein for suitably supporting the fuel rods, in the form of conventional bundles (not shown), which allows flow of the water 16 upwardly through the core 14. The core 14 also includes a top 14b in the form of a plate or grid or other suitable structure for allowing the control rods 30 to be inserted downwardly therethrough into the core 14. In the exemplary embodiment illustrated in FIG. 1, the control rods 30 are withdrawn upwardly above the core 14 as shown in solid line, and inserted downwardly into the core 14 as shown in dotted line along the vertical direction indicated by the double arrow V.

Instead of conventionally translating the control rod 30 in the vertical direction using a conventional control rod drive and straight actuator rod all aligned vertically and coaxially with each other, the drive assembly 28 includes a flexible cable 32 having a distal end 32a which is selectively releasably joined to the control rod 30 by a coupling 34 in accordance with one embodiment of the present invention. A drive means 36, or simply drive 36, is suitably joined to a proximal end 32b of the cable 32 for selectively driving, or advancing and retracting in opposite directions the cable 32 for selectively positioning the control rod 30 in the reactor core 14. The cable 32 is flexible as opposed to rigid so that it is elastically bendable at an inclination angle A away from the vertical axis 18 while still allowing the control rod 30 to be inserted into or withdrawn from the core 14. The inclination angle A is preferably less than 180°, and in the exemplary embodiment illustrated in FIG. 1 it is about 90°, so that the drive assembly 28 need not be oriented solely vertically for translating or driving the control rod 30 in the vertical direction V, but instead may extend in part horizontally to the vertical axis 18 for providing a more compact arrangement.

As illustrated in FIG. 1, the cable 32 has a bend B of about 90° which may be positioned as close to the reactor core 14 as desirable for reducing the overall length of the drive assembly 28. The drive 36 may therefore be disposed to the side of the reactor core 14 for reducing the vertical height requirement of the drive assembly 28. Although the cable 32 and the drive 36 could be located inside the pressure vessel 12 above or below the core 14, in the exemplary and preferred embodiment illustrated in FIG. 1, the cable 32 extends downwardly from the core 14 inside the pressure vessel 12 and sealingly through a wall 12a thereof, such as the lower head, to outside the vessel 12 within or outside the containment building for example. Since the pressure vessel 12 must accommodate relatively high pressures of up to about 70 kg/cm$^2$ in a boiling water reactor for example, the cable 32 must be suitably sealed as it passes through the vessel wall 12a to prevent the loss of pressure from the vessel 12 or the escape of the water 16 or steam 16a therefrom.

In a preferred embodiment, a cable conduit 38, or guide sleeve, extends from the core 14 inside the vessel 12 and conventionally sealingly through the wall 12a to outside the vessel 12, and is sealingly joined to the drive 36. The cable 32 is disposed inside the conduit 38 which guides its movement therein, with the conduit 38 itself forming an extension of the pressure vessel 12 for preventing leakage of the reactor water 16 therefrom. Since the drive 36 is disposed outside the vessel 12, it too is an extension of the pressure vessel 12 for preventing leakage of the reactor water 16.

Since in this exemplary embodiment, the cable 32 and conduit 38 extend downwardly from the core bottom 14a and through the vessel wall 12a, the drive 36 is effective for advancing the cable upwardly through the core 14 for withdrawing the control rod 30 upwardly from the core top 14b, and for retracting the cable 32 downwardly from the core 14 for inserting the control rod 30 into the reactor core 14 from the top 14b thereof. The cable 32 although being flexible for making the bend B, may also be suitably rigid so that as it is pushed in compression or advanced upwardly within the conduit 38 by the drive 36 it may accommodate suitable compression without buckling for lifting the weight of the control rod 30. The inner diameter of the conduit 38 and the outer diameter of the cable 32 may be conventionally sized for providing a predetermined clearance therebetween to increase the buckling resistance of the cable 32 by confining its lateral bending within the conduit 38 in an embodiment where the cable 32 is used to push the control rod 32 upwardly.

In the exemplary embodiment illustrated in FIG. 1, the cable 32 itself need not be so effective for pushing upwardly the control rod 30 and, therefore, means in the form of a conventional pump 40 and an outlet conduit 40a are suitable joined in flow communication with the cable conduit 38 for providing a selectively pressurized driving fluid 42, such as water, inside the cable conduit 38 to apply a pressure force upwardly against the coupling 34 for translating the coupling 34 and the control rod 30 joined thereto upwardly through the core 14.

Figure 2:
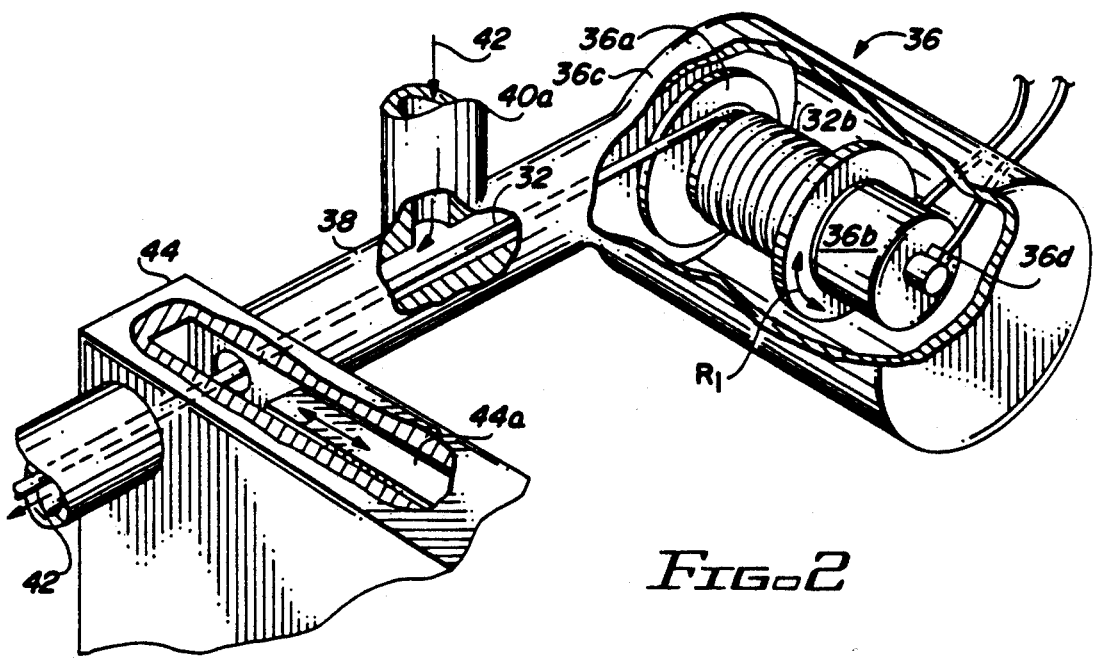
FIG. 2 is a perspective schematic representation of one embodiment of a drive for advancing and retracting the cable used in the drive assembly illustrated in FIG. 1.

More specifically, and referring to FIG. 2, the outlet conduit 40a is conventionally joined to the cable conduit 38 for selectively channeling therein the driving fluid 42 at a pressure suitably greater than the pressure within the pressure vessel 12 for providing a differential pressure across the coupling 34 for selectively lifting the control rod 30 as the cable 32 is advanced by the drive 36. In this exemplary embodiment, the drive 36 includes a rotor spool 36a which is selectively rotatable in opposite directions indicated by the double arrow $R_1$ by a conventional motor 36b. The motor 36b may be electric, or water or air powered as is conventionally known, with both the spool 36a and the motor 36b being contained within a housing 36c which provides a pressure barrier in flow communication with the cable conduit 38 for containing the pressurized driving fluid 42 while preventing leakage of the reactor water 16 from the pressure vessel 12.

The cable 32 may be any suitable cable such as a stainless steel cable with the proximal end 32b thereof being suitably joined to the spool 36a so that the spool 36a may wind the cable 32 thereon to retract the cable 32 through the cable conduit 38 for inserting the control rod 30 into the core 14, and unwinding the cable 32 to advance the cable 32 upwardly through the cable conduit 38 for withdrawing the control rod 30. The cable 32 itself may be used as an accurate indicator of the vertical position of the control rod 30 within the core 14 by conventionally measuring its extended length using, for example, a conventional counter 36d, such as a position sensor, with the number of rotations of the spool 36a being directly proportional to the position of the control rod 30 joined to the cable 32.

As shown in FIGS. 1 and 2, a conventional gate valve 44 having a selectively movable gate 44a may be disposed in series flow within the cable conduit 38 outside the pressure vessel 12 for sealingly isolating the drive 36 from the pressure vessel 12 for performing maintenance for example. During a maintenance operation, the cable 32 may be withdrawn from the cable conduit 38, and the valve 44 closed to prevent leakage of the reactor water 16 from the vessel 12.

Figure 3:
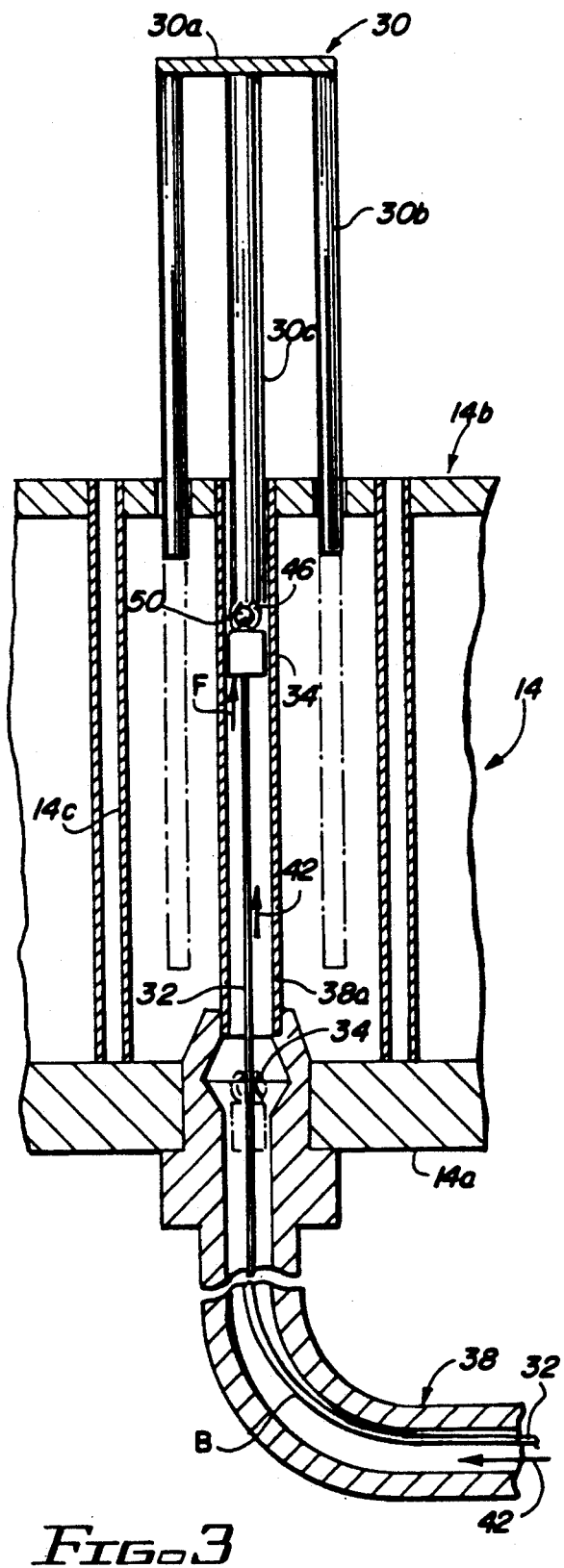
FIG. 3 is an enlarged elevation view, partly in section, of a portion of the reactor core illustrated in FIG. 1 including a portion of the drive assembly for positioning a control rod therein.
Figure 5:
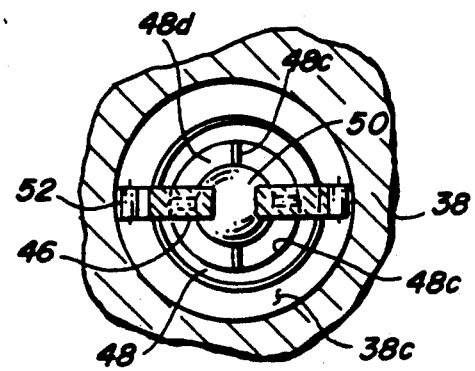
FIG. 5 is a transverse, partly sectional view of the coupling illustrated in FIG. 4 taken along line 5—5.

The cable conduit 38 joined to one of the control rods 30 is illustrated in more particularity in FIG. 3. The cable conduit 38 is suitably joined to the core bottom 14a and includes a portion or extension 38a which extends upwardly through the core 14 to the core top 14b. The conduit extension 38a may preferably form an integral portion of conventional fuel bundles 14c forming the core 14 so that it is removable with its fuel bundle during maintenance. The coupling 34 is slidingly disposed inside the cable conduit 38 with the cable 32 extending from the coupling 34 and through the cable conduit 38 to the drive 36. The driving fluid 42 channeled inside the cable conduit 38 flows upwardly against the bottom of the coupling 34 to apply a pressure force designated F upwardly against the coupling 34 for lifting the control rod 30 for the withdrawal thereof from the core 14. The coupling 34 is suitably sized for the pressure of the driving fluid 42 for providing an upward force greater than the weight of the control rod 30, and the drive 36 is suitably effective for advancing the cable 32 for allowing the pressure force F to lift the control rod 30, or for retracting the cable 32 to pull the control rod 30 downwardly against the pressure force F for inserting the control rod 30.

The control rod 30 in this exemplary embodiment includes a top support 30a from which extends downwardly a plurality of conventional control rod fingers 30b containing suitable nuclear poison as is conventionally known. In alternate embodiments of the invention, other types of control rods 30 may be used such as the conventionally known cruciform type control rod. Also extending downwardly from the top support 30a is an actuator rod 30c having at its bottom or distal end a plurality of pivotable grapple prongs 46 which are conventionally pivoted at one end to the actuator rod 30c.

Figure 4:
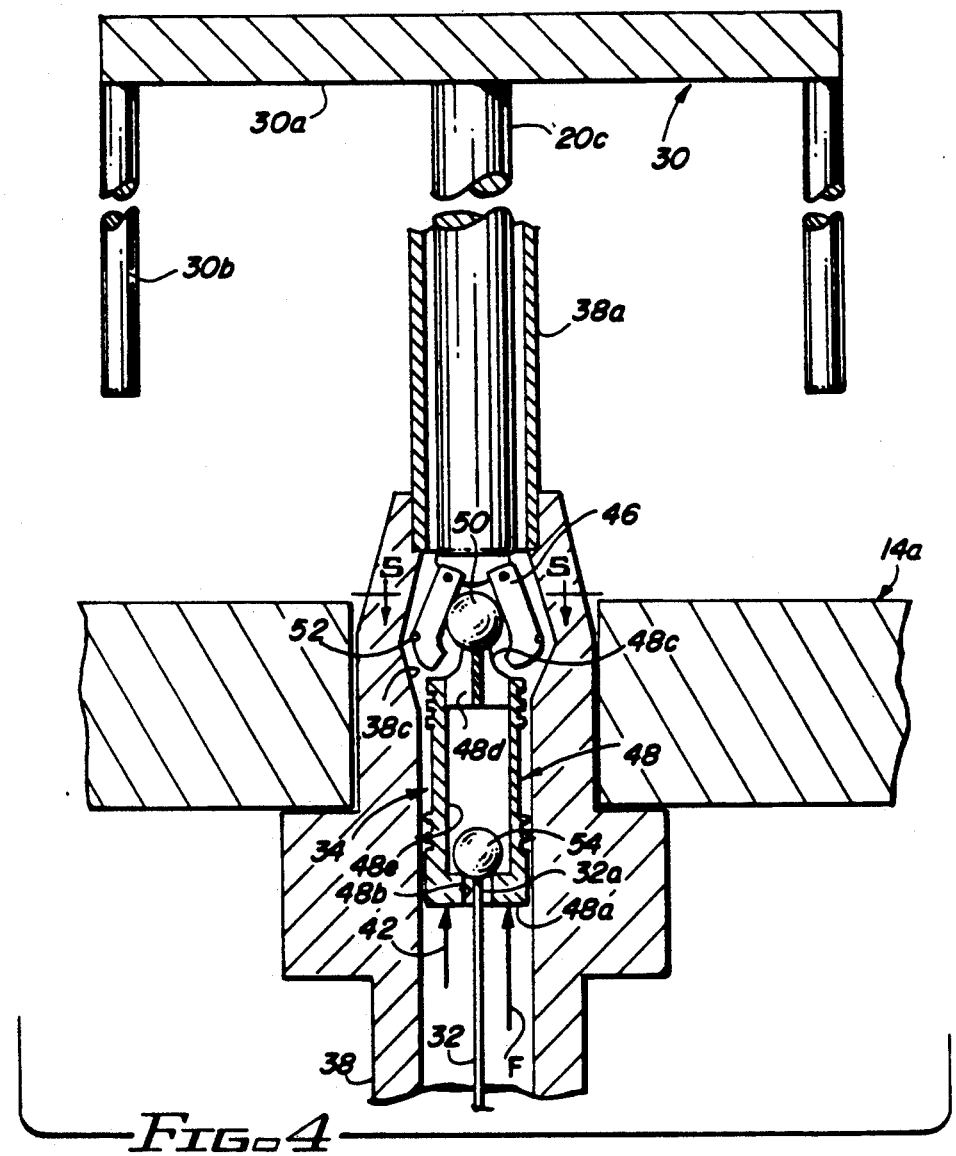
FIG. 4 is an enlarged, partly sectional view of a portion of the drive assembly shown in FIG. 3 illustrating in more particularity a cable coupling therein.

The coupling 34 is illustrated in more particularity in FIG. 4 and includes a hollow piston 48 having an outer diameter which is less than the inner diameter of the cable conduit 38 for allowing the piston 48 to slide therethrough. The piston 48 includes conventional annular grooves around its perimeter for providing conventional labyrinth seals with the inside of the cable conduit 38, or may, alternatively, have conventional piston sealing rings. The piston 48 includes a bottom or distal end 48a with an inlet hole 48b therethrough. The piston 48 has a top or proximal end 48c in the form of radial ribs with openings between them to define an outlet 48d. The piston 48 also includes a central bore 48e which extends in flow communication between the inlet 48b and the outlet 48d.

A first ball 50 is fixedly joined to the piston proximal end 48c, and the grapple prongs 46 are preferably arcuate for capturing therebetween the first ball 50. As shown in FIG. 3, the first ball 50 and the prongs 46 are sized so that while the prongs 46 are engaged around the first ball 50 within the conduit extension 38a, the coupling 34 is allowed to translate within the conduit extension 38a, with the extension 38a preventing the prongs 46 from pivoting outwardly for releasing the first ball 50. Outer edges of the prongs 46 may slide along the inner surface of the conduit extension 38a, and as shown in FIG. 4, a pair of conventional rollers 52 may be conventionally joined to the prongs 46 for providing a wear reducing interface between the prongs 46 and the inside of the conduit extension 38a.

As shown in FIGS. 4 and 6, the cable conduit 38 preferably includes an enlarged inner recess 38c located adjacent the core bottom 14a for receiving the prongs 46 when the control rod 30 is fully inserted within the reactor core 14. The enlarged recess 38c is sized for allowing the grapple prongs 46 to pivot away from the first ball 50 for allowing the actuator rod 30c of the control rod 30 to be disconnected from the cable 32 so that the control rod 30 may be removed from the core 14 to be replaced, for example. As shown in FIG. 6, the enlarged inner recess 38c allows the cable 32 to be retracted downwardly, with the first ball 50 urging outwardly the prongs 46 for separating the first ball 50 therefrom. Alternatively, the actuator rod 30c may be lifted upwardly which will cause the prongs 46 to uncouple from the first ball 50 as the control rod 30 is conventionally withdrawn by a suitable hoist for example. By locating the recess 38c for receiving the prongs 46 where the control rod 30 is fully inserted in the reactor core 14, unintentional uncoupling of the control rod 30 from the cable 32 is prevented during operation of the reactor core 14 which improves the safety of operation thereof. The control rod 30 may be uncoupled solely when it is fully inserted within the reactor core 14 for decreasing the reactivity thereof, and when the coupling 34 is spaced away from the recess 38c inside the conduit extension 38a, the control rod 30 cannot be uncoupled.

Referring again to FIG. 4, the coupling 34 further includes a second ball 54 disposed in the piston bore 48e and fixedly joined to the cable distal end 32a. During normal operation of the drive assembly 28, the driving fluid 42 applies the pressure force F upwardly against the piston distal end 48a for generating tension in the cable 32 and for seating the second ball 50 against the piston inlet 48b. In this way, the pressure force F is maintained against the piston distal end 48a for selectively lifting the control rod 30 without leakage of the driving fluid 42 upwardly through the piston inlet 48b and past the second ball 54. The labyrinth seal surrounding the piston 48 conventionally seals flow of the driving fluid 42 between the piston 48 and the surrounding cable conduit 38 for maintaining the pressure force F. In this way, the driving fluid 42 acts upwardly against the piston distal end 48a to lift and withdraw the control rod 30 from the reactor core 14 as the drive 36 advances the cable 32 upwardly. And, as the drive 36 retracts the cable 32 downwardly against the pressure force F exerted by the driving fluid 42, the coupling 34 pulls downwardly the control rod 30 against the pressure force F acting on the piston distal end 48a to insert the control rod 30 into the reactor core 14.

Since the pressure force F exerted by the driving fluid 42 against the piston 48 is preferably greater than the weight of the control rod 30, breakage of the cable 32 or release of the tension therein by a failure of the drive 36 would allow the unintentional withdrawal of the control rod 30 from the reactor core 14 but for the preferred coupling 34 including the second ball 54.

Figure 7:
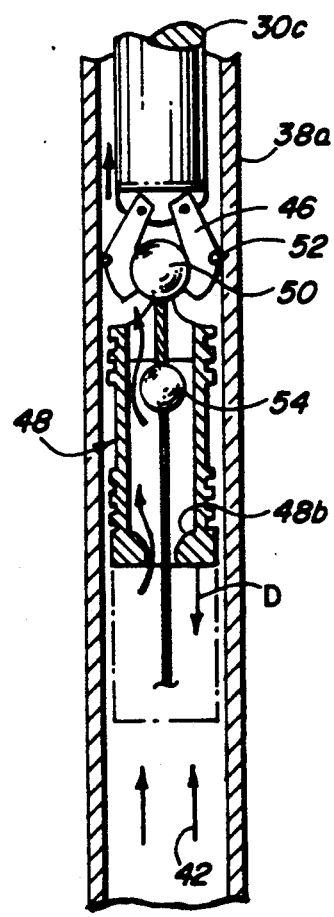
FIG. 7 is an enlarged view of the cable coupling illustrated in FIG. 3 showing severance of the cable therein.

More specifically, the second ball 54 is sized smaller in diameter than the inside diameter of the piston bore 48e so that upon cessation of tension in the cable 32 while the driving fluid 42 exerts a pressure force F upwardly against the piston 48, the driving fluid 42 will unseat the second ball 54 upwardly off the piston inlet 48b which will allow the driving fluid 42 to flow upwardly through the piston 48 for reducing the pressure force F acting against the piston distal end 48a to a value below that of the weight of the control rod 30 for allowing gravity to insert the control rod 30 downwardly into the reactor core 14. The driving fluid 42 will therefore flow through the piston inlet 48b, through the bore 48e, and out the piston outlet 48d and upwardly through the conduit extension 38a for relieving the pressure force F against the piston 48. In this way, such a failure prevents the unintentional withdrawal of the control rod 30 from the reactor core 14, but instead allows gravity to drive the control rod 30 and the piston 48 downwardly as indicated by the arrow D illustrated in FIG. 7 for inserting the control rod 30 into the reactor core 14.

Figure 8:
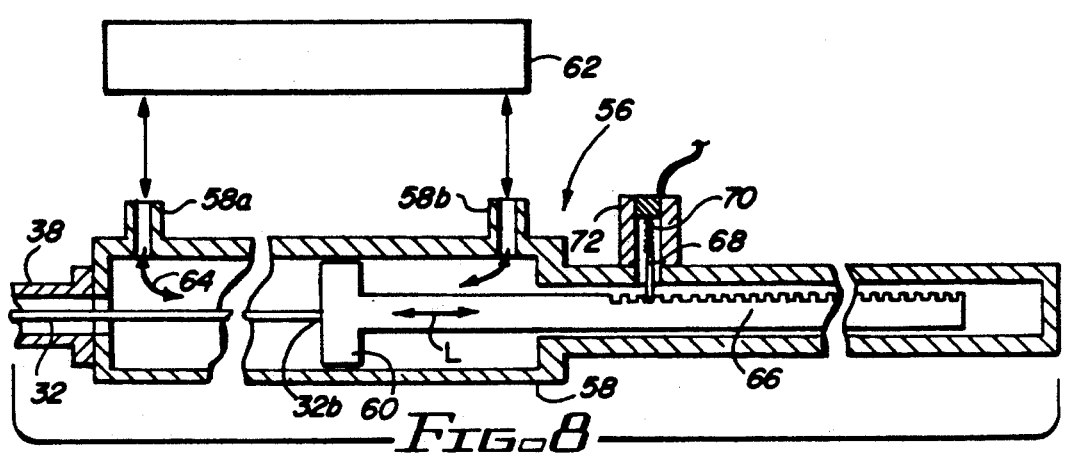
FIG. 8 is a schematic representation of a second embodiment of a drive used for advancing and retracting the cable illustrated in FIG. 1.

Illustrated in FIG. 8 is an alternate, second embodiment of a cable drive designated 56. The second drive 56 includes an elongate housing 58 suitably joined to the cable conduit 38 and containing therein a servopiston 60 fixedly joined to the cable proximal end 32b. The housing 58 includes first and second fluid ports 58a and 58b disposed on opposite sides of the servopiston 60. Conventional means 62 selectively provides a pressurized servofluid 64 such as water under pressure selectively to the first and second ports 58a and 58b to translate the servopiston 60 selectively in opposite directions (designated by the double arrow L) to either advance or retract the cable 32 through the cable conduit 38.

The second drive 56 further includes a ratchet or gear rack 66 extending from the servopiston 60 oppositely to the cable 32, and a ratchet or latch pawl 68 is resiliently urged by a compression spring 70 in cooperating engagement with the rack 66 for allowing translation of the servopiston 60 in only one direction to insert the control rod 30 by retracting the cable 32 for example, while preventing translation of the servopiston 60 in the opposite direction which would advance the cable 32 and withdraw the control rod 30 from the reactor core 14. In this way, once the control rod 30 is positioned at a particular location within the reactor core 14, and the latch pawl 68 is engaged with the rack 66, the servopiston 60 and the cable 32 joined thereto prevent unintentional withdrawal of the control rod 30 from the reactor core 14. However, by providing the servofluid 64 through the first port 58a at a pressure greater than that within the second port 58b, the servopiston 60 may be retracted for retracting the cable 32 for further inserting the control rod 30 within the reactor core 14 as the latch pawl 68 ratchets against the rack 66. This is desirable for allowing scram of the reactor core 14 with full insertion of the control rods 40 without interference by the pawl 68.

In order to withdraw the control rod 30 by advancing the cable 32, a conventional solenoid 72 surrounds a portion of the pawl 68 and supports the spring 70. Upon energizing the solenoid 72, it magnetically withdraws the pawl 68 away from the rack 66 for allowing unobstructed travel of the rack 66 and the servopiston 60 joined thereto to advance the cable 32 by movement of the rack 66 to the left.

Illustrated in FIG. 9 is yet another, third drive designated 74 effective for advancing and retracting the cable 32 for positioning the control rod 30 within the reactor core 14. The third drive 74 includes a pressure housing 76 suitably joined to the cable conduit 38 and in which is positioned a conventional leadscrew 78 fixedly joined to the cable proximal end 32b. An electric motor 80 includes a conventional rotor 80a preferably disposed within the housing 76, and a conventional stator 80b preferably disposed around the housing 76, with the rotor and stator being electromagnetically coupled through the housing 76. The leadscrew 78 extends through the center of the rotor 80a. The rotor 80a is suitably supported by conventional bearings for rotating selectively in opposite directions shown by the double arrow labeled $R_2$ freely around the leadscrew 78.

A pair of levers 82 having threads thereon being complementary to the leadscrew 78 are pivotally mounted to the rotor 80a for rotation therewith. A respective pair of tension springs 84 are suitably joined between the levers 82 and the housing 76 for resiliently urging away the levers 82 from engagement with the leadscrew 78.

A latch coil or solenoid 86 surrounds the housing 76 adjacent to the levers 82 and is energizable for magnetically engaging the levers 82 with the leadscrew 78 so that rotation of the rotor 80a and the levers 82 therewith around the leadscrew 78 translates the leadscrew 78 either upwardly or downwardly for selectively advancing and retracting the cable 32 joined thereto. Suitable means for preventing rotation of the leadscrew 38 caused by the friction between the levers 82 cooperating therewith are provided, such as a key 88 slidingly disposed in a respective vertical slot within the leadscrew 78. Since the leadscrew 78 does not rotate, and the levers 82 threadingly engaged with the leadscrew 78 are caused to rotate by the rotor 80a, the leadscrew 78 will threadingly be translated either upwardly or downwardly relative to the levers 82 for advancing and retracting the cable 32. The latch coil 86 magnetically engages the levers 82 against the leadscrew 78 so that the leadscrew 78 may be translated upwardly or downwardly upon respective rotation of the rotor 80a. When the latch coil 86 is deenergized, the springs 84 disengage the levers 82 from the leadscrew 78 for allowing the leadscrew 78 to fall downwardly relative to the levers 82, which allow gravity to insert the control rod 30 into the reactor core 14.

In order to provide a pressure assisted scram or insertion of the control rod 30 into the reactor core 14, the leadscrew 78 preferably includes a servopiston 90 fixedly joined thereto at one end within the housing 76. The housing 76 further includes a pair of fluid ports 92a, 92b joined in flow communication with conventional means 94 for providing a selectively pressurized servofluid 96 such as water under pressure downwardly across the servopiston 90 to retract the leadscrew 78 when the levers 82 are disengaged therefrom. In this way, both gravity and the pressurized servofluid 96 may be used for inserting the control rod 30 into the reactor core 14 during a scram operation for example.

In the preferred embodiment of the invention illustrated in FIG. 1, the drive assemblies 28 are preferably located below the reactor core 14 and extend transversely outwardly therefrom for decreasing the vertical height required. However, in an alternate embodiment of the invention as illustrated in FIG. 10, the drive assembly 28, only a portion of which is illustrated, may be disposed above the reactor core 14. In this embodiment, the cable conduit 38 extends upwardly from the core top 14b, and the drive 36, for example, is effective for retracting the cable 32 upwardly to lift and withdraw the control rod 30 from the reactor core 14. And, the cable 32 may be advanced downwardly to allow gravity to insert the control rod 30 into the reactor core 14. Also in this embodiment, the driving fluid 42 may be used to exert the pressure force F downwardly on the coupling 34 for providing a pressure assisted scram insertion of the control rod 30 into the reactor core 14 as shown in phantom.

In this exemplary embodiment, the actuator rod 30c of the control rod 30 extends upwardly from within a closed end of a tube 30d which extends upwardly to a central aperture in the top support 30a. The conduit extension 38a extends downwardly into the tube 30d to about the core top 14b so that the tube 30d is guided upwardly and downwardly thereover. And, the driving fluid 42 may exert a downward force against the coupling 34, or in an alternate embodiment it would flow past the coupling 34 and exert a downward force against the bottom of the tube 30d for inserting the control rod 30 into the reactor core 14.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. An assembly for selectively positioning a control rod along a vertical axis in a nuclear reactor core disposed inside a reactor pressure vessel comprising:
   a flexible cable slidably disposed through a cable conduit;
   a coupling releasably joining said cable to said control rod;
   a drive joined to said cable for selectively advancing and retracting said cable in opposite directions through said cable conduit for selectively positioning said control rod in said reactor core;
   said coupling being slidingly disposed inside said cable conduit with said cable extending from said coupling and through said cable conduit to said drive; and
   pressurizing means for providing a selectively pressurized driving fluid inside said cable conduit to apply a pressure force against said coupling for translating said coupling and said control rod joined thereto.

2. An assembly according to claim 1 further comprising:
   said a cable conduit extending from said reactor inside said pressure vessel to outside said pressure vessel; and
   said drive being disposed on said pressure vessel outside.

3. An assembly according to claim 2 wherein:
   said reactor core includes a top and a bottom;
   said cable conduit extends downwardly from said core bottom; and
   said drive is effective for pushing said cable upwardly through said cable conduit to lift and withdraw said control rod from said reactor core, and for retracting said cable downwardly to insert said control rod in said reactor core.

4. An assembly according to claim 2 wherein:
   said control rod includes an actuator rod having a plurality of pivotable grapple prongs;
   said coupling includes:
      a piston having a distal end with an inlet, a proximal end with an outlet, and a central bore extending in flow communication between said inlet and said outlet;
      a first ball fixedly joined to said piston proximal end, said grapple prongs being releasably joined around said first ball; and
      a second ball disposed in said piston bore and fixedly joined to said cable; and
   said driving fluid applies said pressure force against said piston distal end for generating tension in said cable and for seating said second ball against said piston inlet.

5. An assembly according to claim 4 wherein said cable conduit includes an enlarged inner recess sized for allowing said grapple prongs to pivot away from said first ball for allowing said control rod to be disconnected from said cable.

6. An assembly according to claim 2 wherein:
   said reactor core includes a top and a bottom;
   said cable conduit extends downwardly from said core bottom; and
   said drive is effective for advancing said cable upwardly to allow said driving fluid to act upwardly against said piston distal end to lift and withdraw said control rod from said reator core, and for retracting said cable downwardly against said pressure force acting on said piston distal end to insert said control rod into said reactor core.

7. An assembly according to claim 6 wherein said second ball is sized smaller than said piston bore so that upon cessation of said tension in said cable said pressurized driving fluid unseats said second ball off said piston inlet for reducing said pressure force acting against said piston distal end for allowing gravity to insert said control rod into said reactor core.

8. An assembly according to claim 2 wherein:
   said reactor core includes a top and a bottom;
   said cable conduit extends upwardly from said core top; and
   said drive is effective for retracting said cable upwardly to lift and withdraw said control rod from said reactor core, and for advancing said cable downwardly to allow gravity to insert said control rod into said reactor core.

9. An assembly according to claim 2 wherein said drive includes a spool driven by a motor to selectively wind said cable to retract said cable through said cable conduit, and unwind said cable to advance said cable through said cable conduit.

10. An assembly according to claim 2 wherein said drive includes:
- a servopiston fixedly joined to said cable and disposed in a housing, said housing including first and second ports disposed on opposite sides of said servopiston; and
- means for providing a servofluid under pressure selectively to said first and second ports to translate said servopiston in opposite directions to advance or retract said cable.

11. An assembly according to claim 10 wherein said drive further includes:
- a ratchet rack extending from said servopiston; and
- a ratchet latch pawl resiliently urged in cooperation with said ratchet rack for allowing translation of said servopiston in one of said opposite directions and for preventing translation of said servopiston in the other of said opposite directions.

12. An assembly according to claim 2 wherein said drive comprises:
- an electric motor including a rotor and a stator;
- a leadscrew fixedly joined to said cable and extending through said rotor;
- a pair of levers having threads resiliently urged away from said leadscrew and being pivotably mounted to said rotor for rotation therewith;
- a latch coil surrounding said levers and energizable for magnetically engaging said lever threads with said leadscrew so that rotation of said rotor and said levers around said leadscrew translates said leadscrew for selectively advancing and retracting said cable joined thereto.

13. An assembly according to claim 12 wherein said leadscrew includes a servopiston fixedly joined thereto; and further including means for providing a servofluid under pressure against said servopiston to retract said leadscrew when said levers are disengaged from said leadscrew.

14. An assembly according to claim 2 further including means for sensing extended length of said cable for indicating position of said control rod in said core.

* * * * *